Patented Oct. 27, 1953

2,657,172

UNITED STATES PATENT OFFICE 2,657,172

THERAPEUTIC SOLUTION OF CALCIUM LACTATE AND CALCIUM GLYCEROPHOSPHATE

Gustav Sattler, Jr., deceased, late of New York, N. Y., by Beatrice Sattler, administratrix, New York, N. Y., and Beatrice Sattler, New York, N. Y., assignors, by mesne assignments, to The Carlton Corporation, New York, N. Y., a corporation of New York No Drawing. Application June 22, 1950, Serial No. 169,778

2 Claims. (Cl. 167—68)

This invention relates to crystal clear therapeutic organo-calcium salt solutions in normal physiological saline, containing calcium glycerophosphate and calcium lactate and having a pH in the range of 7.0 to 7.5; and more particularly to such solutions containing 0.5% by weight of calcium glycerophosphate and 0.5% of calcium lactate. The invention also relates to particular methods for preparing these crystal clear solutions.

The invention also relates to a method of using these solutions subcutaneously or intramuscularly in calcium therapy, by injecting small amounts of the solution at convenient intervals, until the blood serum calcium concentration is brought up to the desired level. The increase in the calcium content of the serum may be up to about 10 times the amount of the calcium injected; indicating conversion of calcium material in the body to an available form.

The art is confronted with the problem of providing a therapeutic calcium solution suitable for comfortable subcutaneous or intramuscular injection. For this purpose, the solution should be crystal clear. So far as is known, no satisfactory answer to this problem has been provided heretofore.

Many calcium preparations have been suggested heretofore; e. g., calcium gluconate and the like. Generally, these are applied intravenously.

Intravenous application is quite unsatisfactory; especially since the increase produced by the injection is so transient that the initial hypocalcemia which is being treated is not significantly changed after a few hours. This is true even with the use of heretofore proposed solutions of relatively high concentration, e. g., a supersaturated 10% or more solution of calcium gluconate, calcium lactate, calcium levulinate, calcium glycerophosphate, calcium ascorbate, calcium levugluconate, or the like containing stabilizers. Generally, these solutions have the inherent drawback that the pH thereof is too low, e. g., down to about 4.5–5.5, or too high, e. g., 8.0 or higher. Care must be taken in administering these solutions so that the fluid does not get out of the vein, in order to avoid induration or sloughing of the perivascular tissues.

The present invention is associated with the surprising discovery that a 1% solution of equal parts by weight of calcium glycerophosphate ($CaO_2.PO.OC_3H_5(OH)_2$) and calcium lactate ($Ca(C_3H_5O_3)_2$) in physiological saline has a pH in the range of 7.0 to 7.5, is crystal clear, and is admirably suited for subcutaneous or intramuscular injection without the very undesirable lasting pain, skin necroses, indurations and the like usually associated with heretofore suggested calcium therapy preparations when injected subcutaneously or intramuscularly.

In addition, upon subcutaneous or intramuscular injection, there is a marked increase in blood serum calcium concentration, far above the amount provided by the injection; indicating synergism or potentiation of the injected solution with other calcium material in the body.

The objects achieved in accordance with the invention include the provision of a crystal clear therapeutic physiological saline solution containing a total up to about 1% or somewhat more of calcium glycerophosphate plus calcium lactate and having a pH in the range of 7.0 to 7.5; the provision of methods of preparing such crystal clear solutions; the provision of methods of using such solutions subcutaneously or intramuscularly by injection thereof to obtain an increase in serum calcium level far above the amount of calcium injected thereby; and other objects which will be apparent as details or embodiments of the invention are set forth hereinafter.

In order to facilitate a clear understanding of the invention the following specific embodiments are included.

Example 1

5 gms. of calcium lactate (C. P.) is dissolved in 500 cc. of normal physiological saline (USP XI 0.85% of 99.5% pure sodium chloride salt in sterile distilled water);

5 gms. of calcium glycerophosphate (C. P.) is dissolved in 500 cc. of normal physiological saline.

After these separate solutions are perfectly clear, they are mixed, 0.5% phenol is added thereto (to prevent mold growth) and the solution is sterilized, e. g., by using a Berkefeld or a Seitz or an ultra-fine sintered glass filter; and then filled into thoroughly washed non-corrosive glass containers such as ampoules or rubber stoppered vials, and hermetically sealed.

Example 2

5 gms. of calcium lactate
5 gms. of calcium glycerophosphate and
0.085 gm. of sodium chloride are added together to
1000 cc. of distilled water, and then
0.5% of phenol is added thereto and the resulting solution processed as in Example 1.

Each of these solutions has a pH of 7.2. They are crystal clear and stable, even after heat sterilization e. g., at about 80° C. and then cooling to room temperature.

These solutions were clinically tested by injecting 10 cc. thereof subcutaneously or intragluteally; and were found to be absolutely painless (free of lasting pain) and to leave no skin necroses, sloughs or indurations. They were tested for efficacy in raising the blood serum calcium level of persons with varying degrees of hypocalcemia; by determining the initial blood serum calcium and then administering 10 cc. of the solution subcutaneously or intragluteally. Calcium determinations were made thrice weekly and injections were given weekly. After four weeks of such treatment, the injections were stopped and the calcium determinations were made at hebdomadal intervals for four weeks; and then the calcium was determined once a month for another three months, and again after another six months or so. In practically all cases tested, isocalcemia was restored after weekly injections for a month or so, and then maintained for the rest of the six months test period without further injections. Some cases required a few additional injections, but in all cases the blood serum calcium was restored to the normal level (about 10.0 mgms. per 100 cc.).

The 10 cc. injection contains only about 16 mgms. of elemental calcium, and when dispersed in the about 6000 cc. of blood in the average adult should raise the serum calcium no more than about 0.3 mgms. per 100 cc. In the above-mentioned tests, single injections of 10 cc. have given elevations of as much as 10 times that amount; indicating a synergism or potentiation between the injected solution and the reserve of insoluble calcium compounds in the body, to provide this 10-fold increase.

Comparable results are obtained with similar solutions having a pH in the range of 7.0 to 7.5, containing down to about 0.1% or less or up to preferably about 1.5% or in some cases up to about 2.0% total of the calcium glycerophosphate and calcium lactate (calculated as anhydrous), and these solutions may be made up in the above-described manner. The relative proportions of the calcium glycerophosphate and the calcium lactate may be varied providing these variations stay within limits giving the critical pH as discussed above. The one to one ratio is preferred for painless injection purposes.

In other tests, these solutions have been blended with other therapeutic agents, the injection of which agents usually is attended with great pain; to give mixtures which facilitate absorption and at the same time decrease pain. These tested combinations include the above-described mixture of calcium salts plus: (3) vitamin B complex, (4) liver extract (especially the crude), (5) Novocain in therapeutic dosage, (6) water-soluble glandular products such as hormones, (7) tonic iron salts combined with arsenic, (8) vitamin B-12 or the like.

For some purposes, and not necessarily equivalent to the foregoing, analogous solutions may be prepared in distilled water, without including the sodium chloride.

In some instances, such as where freedom from lasting pain is not a problem, the total concentration of the calcium salts may be somewhat higher provided the solution is crystal clear at room temperature.

Calcium was determined by the method of Sobel & Sklersky. Briefly, this consists of adding 0.1 cc. each of saturated ammonia oxalate and distilled water to a 1/10 of cc. of serum, in a special flat-bottomed Pyrex centrifuge tube of 3 cc. capacity. The great excess of oxalate ion insures complete precipitation of calcium oxalate. After standing 3 hours, the tubes were rapidly centrifuged for fifteen minutes. The supernatant fluid is carefully aspirated by a fine tipped dropper. Then 0.3 cc. of 0.5% ammonium oxalate is added and the tube is tapped to wash the precipitate. After another centrifuging, the supernatant fluid is removed and the tube is placed in the drying oven to remove water. The tube is then placed in a furnace at 500° C. for half an hour to convert the calcium oxalate to the carbonate. Organic matter and the excess ammonium oxalate are completely volatilized. Then 0.05 cc. of a 10% solution of boric acid (kept at 100° C. to maintain solubility) is added by means of a heated pipette. The calcium precipitate is dissolved and the solution is titrated with 0.01 N HCl using Ma & Zuazaga's indicator with a blank as the standard for the end point.

A desirable feature of these preparations is that they are free of such materials as acetanilide, acids which lower the pH unduly, or alkaline salts which raise the pH unduly; and they do not form precipitates upon sterilizing, which precipitates are very undesirable in an injection fluid.

The foregoing specific descriptions are for purposes of illustration, and the invention includes all variations and modifications thereof apparent to those skilled in the art and coming within the scope of the appended claims.

The term "consisting essentially of" as used in the claims does not exclude components which would not affect the utility of the composition for its intended purpose, such as preservatives, mold inhibitors, other medicaments such as those referred to heretofore, and the like, but does exclude substances which would render the composition unsuitable or dangerous for administration to humans.

What is claimed is:

1. A therapeutic calcium composition suitable for subcutaneous or intramuscular injection consisting essentially of a crystal clear solution of calcium glycerophosphate and calcium lactate in physiological saline solution, containing from about 0.1 to about 2.0% by weight total of these calcium salts and having a pH in the range of 7.0 to 7.5.

2. The composition of claim 1 containing 0.5% of the calcium glycerophosphate and 0.5% of the calcium lactate.

BEATRICE SATTLER.
*Pro se and as administratrix of the estate of Gustav Sattler, Jr., deceased.*

References Cited in the file of this patent

UNITED STATES PATENTS

| Number | Name | Date |
|---|---|---|
| 2,144,830 | Breed | Jan. 24, 1939 |

FOREIGN PATENTS

| Number | Country | Date |
|---|---|---|
| 345,062 | Germany | Dec. 5, 1921 |

OTHER REFERENCES

Husa: Pharmaceutical Dispensing, 3rd edition, 1947, Husa Brothers, Iowa City, Iowa, pages 647 to 648, 664 and 665.

Osol et al.: Dispensatory U. S. 1947, 24th edition, J. P. Lippincott, Philadelphia, page 1700.

Ludwig: Reportorium pharmazeutischer Spezial praparate Sera und Impfstoffe Supplement Basel 1947 Verlags-gessellschaft Beobachte A. G., pages 101, 102, 182.

Nobili: Squibb Abstract Bulletin, volume 10 (1937), page 2225.